(12) United States Patent
Shin et al.

(10) Patent No.: US 8,574,689 B2
(45) Date of Patent: Nov. 5, 2013

(54) O-PLATE HAVING EXCELLENT DURABILITY AND ITEGRATED POLARIZING PLATE COMPRISING THE SAME

(75) Inventors: Du-Hyun Shin, Daejeon (KR); Chang-Hun Yun, Jeollanam-do (KR); Byoung-Kun Jeon, Daejeon (KR); Moon-Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1131 days.

(21) Appl. No.: 12/224,872

(22) PCT Filed: Nov. 15, 2007

(86) PCT No.: PCT/KR2007/005731
§ 371 (c)(1),
(2), (4) Date: Sep. 9, 2008

(87) PCT Pub. No.: WO2008/060108
PCT Pub. Date: May 22, 2008

(65) Prior Publication Data
US 2009/0117293 A1 May 7, 2009

(30) Foreign Application Priority Data
Nov. 16, 2006 (KR) .................. 10-2006-0113253

(51) Int. Cl.
*C09K 19/00* (2006.01)

(52) U.S. Cl.
USPC .............. 428/1.3; 428/1.2; 349/93; 349/117; 349/96; 349/123; 349/124

(58) Field of Classification Search
USPC ......... 428/1.2, 1.3, 1.5; 349/117, 119, 75, 93, 349/96, 123–124; 359/485.03, 489.07; 522/84, 86, 8, 109, 121
See application file for complete search history.

(56) References Cited

U.S. PATENT DOCUMENTS

| | | | |
|---|---|---|---|
| 4,410,621 A * | 10/1983 | Wada et al. | 430/281.1 |
| 5,699,136 A | 12/1997 | Arakawa et al. | |
| 6,649,231 B2 | 11/2003 | Ito | |
| 6,660,182 B2 | 12/2003 | Jester | |
| 7,858,669 B2 * | 12/2010 | Shin et al. | 522/8 |
| 2006/0233970 A1 * | 10/2006 | Takahashi et al. | 428/1.1 |
| 2009/0312453 A1 | 12/2009 | Shin et al. | |

FOREIGN PATENT DOCUMENTS

| | | | |
|---|---|---|---|
| JP | 7-179125 | | 7/1995 |
| JP | 2002-62426 A | | 2/2002 |
| JP | 2004206100 A | * | 7/2004 |
| JP | 2004-361600 A | | 12/2004 |
| JP | 2005-099329 A | | 4/2005 |
| JP | 2008-076517 A | | 4/2008 |
| JP | 2009-533708 A | | 9/2009 |
| KR | 10-2004-0025862 A | | 3/2004 |
| KR | 10-2004-0095176 A | | 11/2004 |
| TW | 200521553 A | | 7/2005 |

* cited by examiner

*Primary Examiner* — Sophie Hon
*Assistant Examiner* — Ruiyun Zhang
(74) *Attorney, Agent, or Firm* — McKenna Long & Aldridge, LLP

(57) ABSTRACT

There are provided an optical compensation film including an alignment film whose adhesiveness to a substrate and a liquid crystal layer and alignment property are excellent when a novel substrate is used to solve the problem regarding deteriorated durability being caused when a retardation film including a liquid crystal film is used under a hot and humid environment, and an integrated polarizing plate comprising the same. The O-plate includes a substrate; an alignment film prepared by coating the substrate with a composition for an alignment film that is composed of polyvinyl alcohol, a multifunctional acrylate monomer, a compatibilizing agent, a photo initiator and a solvent, followed by undergoing drying, curing and rubbing processes; and a splay-aligned liquid crystal film formed on the alignment film.

15 Claims, 6 Drawing Sheets

O-PLATE HAVING EXCELLENT DURABILITY AND ITEGRATED POLARIZING PLATE COMPRISING THE SAME

This application is a 371 national stage entry of International Application No. PCT/KR2007/005731, filed on Nov. 15, 2007 that claims priority to Korean Patent Application No. 10-2006-0113253, filed on Nov. 16, 2006, both of which are hereby incorporated by reference in their entirety.

TECHNICAL FIELD

The present invention relates to an O-plate having excellent durability and an integrated polarizing plate comprising the same, and more particularly, to an optical compensation film including an alignment film whose adhesiveness to a substrate and a liquid crystal layer and alignment property are excellent even if a novel substrate is used to solve the problem regarding deteriorated durability being caused when a retardation film including a liquid crystal film is used under a hot and humid environment, and an integrated polarizing plate comprising the same.

BACKGROUND ART

A liquid crystal display device (LCD) is a display device that expresses pixels on the principle of selectively penetrating light depending on the changes in polarization effects according to the array of liquid crystal disposed between polarizing plates.

IF the display device consists of the liquid crystal and polarizing plate comprising only polarizer, brightness or contrast is seriously deteriorated, or light leakage is caused when a liquid crystal is viewed at various viewing angles except when the liquid crystal is viewed vertically from the front side of a liquid crystal screen. Therefore, the polarizing plate includes an optical compensation film, such as a retardation film or a viewing angle compensation film, in addition to the polarizer, or these films are generally adhered to a panel through a separate process.

The optical compensation film is mainly divided into two films: one stretched film prepared by stretching a polymer film to give optical anisotropy, and the other liquid crystal film prepared by coating a plastic substrate with a polymeric liquid crystal compound and curing the polymeric liquid crystal compound. In particular, the stretched film does not have anisotropy such as optically uniaxial or biaxial anisotropy, but the liquid crystal film may have various optical properties that the aligned film may not have. Liquid crystal may be mainly divided into a disc-type liquid crystal and a rod-type liquid crystal, depending on the shape of the liquid crystal molecules. Among them, the rod-type liquid crystal can be aligned in various shapes such as planar, homeotropic, tilted, splay, cholesteric shapes, and therefore their optical properties owing to the various shapes are also diverse and unique, compared to those of the aligned film. Also, the liquid crystal film may function as a protective film and an optical compensation film of the polarizer by forming the liquid crystal film on the aligned film. Accordingly, the liquid crystal film has been increasingly demanded.

Particularly in the TN-mode liquid crystal display device, the liquid crystal film may be used as the optical compensation film when the liquid crystal film is splay-aligned. That is, the splay-aligned liquid crystal film may become an optical compensation film for compensating for light leakage or phase difference (viewing angle). Here, when a TAC film used as the protective film of the polarizer is coated with the splay-aligned liquid crystal film, which is later used as the protective film of the polarizer, the protective film may be used as an integrated polarizing plate of the optical compensation film. Generally, an optical compensation film including the splay-aligned liquid crystal film is referred to as an O-plate.

In this case, the splay-aligned liquid crystal film is generally manufactured by coating a plastic substrate with a composition for an alignment film that is used to form a liquid crystal alignment film, drying and curing the composition to form an alignment film, after then rubbing the alignment film to give an alignment property, and coating the alignment film with a liquid crystal, following by repeating the drying and curing process. If the alignment film does not have excellent adhesiveness to the liquid crystal film or the substrate, the liquid crystal film is peeled off from the alignment film, or the liquid crystal film may be shrunken under hot and humid environments. Accordingly, the liquid crystal film with excellent adhesiveness is required.

Polyimide, as a material for an alignment film that is used to form the alignment film, was widely known in the art, but polyvinyl alcohol has been recently used. However, when the polyvinyl alcohol is used in the composition for an alignment film, a liquid crystal film may be peeled off from the alignment film due to the insufficient adhesive force to the liquid crystal film, or the liquid crystal film may be shrunken under hot and humid environments, as described above.

Also, Japanese Patent Laid-open Publication Nos. 2002-62426 and Hei7-179125 disclose a method using a modified polyvinyl alcohol in which polyvinyl alcohol is modified to improve an adhesive force to a liquid crystal film, but it is difficult to directly use the modified polyvinyl alcohol as a coating solution, and therefore the modified polyvinyl alcohol is subject to additional separation and purification process, and then may be used as a composition for an alignment film.

Also, the alignment film is generally formed on a substrate. Since even the composition for an alignment film prepared thus may be restrictively used according to the kind of available substrates, the alignment film may be effectively adhered to the substrate such as triacetyl cellulose (TAC), but adhesiveness to the substrate such as cycloolefin polymer (COP) is poor.

That is, a triacetyl cellulose substrate is widely used to form an alignment film, but has problems that light leakage appears in the substrate under hot and humid environments due to its high hygroscopicity, and its degree of polarization is deteriorated. Therefore, there have been proposed a variety of substrates that may be substituted for the triacetyl cellulose substrate, and a cycloolefin polymer is one representative substrate among them. Here, the cycloolefin polymer may function as at least one of an A-plate (A-plate) and a negative C-plate, as well as a protective film of a polarizer. Accordingly, the cycloolefin polymer has excellent durability under the conditions of high temperature and high humidity, compared to the polarizing plate where triacetyl cellulose is used as a protection layer.

However, the cycloolefin polymer has poor adhesiveness when the conventional composition for an alignment film is used for cycloolefin polymer as described above, and therefore an alignment film may be detached from the cycloolefin polymer.

In addition to the context as described above, the alignment film should also have an basic ability to uniformly align liquid crystal molecules in a rubbing direction when a surface of the alignment film is rubbed, and this ability of the alignment film may be represented by an optical-axis departure angle showing a degree where the liquid crystal molecules depart from the rubbing direction. However, the convention alignment film, namely an alignment film using polyvinyl alcohol, has a alignment to prevent some degree of optical-axis departure, but the degree of optical-axis departure of the alignment film is not sufficient. If a liquid crystal has a high optical-axis departure angle, a polarizing plate made of the liquid crystal has a problem that light leakage may be included and optical loss such as poor contrast ratio may be caused in the polarizing plate.

Accordingly, a retardation film in which the liquid crystal film is well adhered and the liquid crystal film adhered to the alignment film has an excellent alignment property, still remains to be developed.

Also, the polarizing plate generally includes protective films in both sides of a polarizer, and optical compensation films such as a retardation film or a viewing angle compensation film is generally included in the polarizing plate in addition to the protective films. However, layers, which are adhered to a display device, such as a polarizing plate are desirably decreased in thickness as far as possible since the manufacturing cost is higher with an increasing thickness of the polarizing plate, and the increased thickness of the polarizing plate is an obstacle to the display device.

DISCLOSURE OF INVENTION

Technical Problem

An aspect of the present invention provides an O-plate capable of being manufactured without any of separate separation and purification processes and including an alignment film having excellent adhesiveness to a splay-aligned liquid crystal layer formed on an alignment film, and a polarizing plate comprising the O-plate in an integrated form.

Also, another aspect of the present invention provides an O-plate including an alignment film having good adhesiveness to a substrate even when the alignment film is formed on the substrate other than triacetyl cellulose such as cycloolefin polymer, and a polarizing plate comprising the O-plate in an integrated form.

Also, still another aspect of the present invention provides an O-plate including an alignment film capable of minimizing an optical-axis departure of a liquid crystal when a liquid crystal film is formed on the alignment film, and a polarizing plate comprising the O-plate in an integrated form.

Technical Solution

An O-plate according to an aspect of the present invention provides including a substrate; an alignment film prepared by coating the substrate with a composition for an alignment film that is composed of polyvinyl alcohol, a multifunctional acrylate monomer, a compatibilizing agent, a photo initiator and a solvent, followed by undergoing drying, curing and rubbing processes; and a splay-aligned liquid crystal film formed on the alignment film.

In this case, the substrate may include triacetyl cellulose or a cycloolefin polymer (COP).

The composition for an alignment film may include polyvinyl alcohol (PVA); 13 to 25% by weight of an acrylate monomer based on the weight of the polyvinyl alcohol; 20 to 30% by weight of a compatibilizing agent based on the weight of the acrylate monomer; and 10 to 50% by weight of an aqueous photo initiator based on the weight of the acrylate monomer.

Furthermore, one or two or more multifunctional acrylate monomers having 3 to 6 carbon atoms may be used as the acrylate monomer.

Also, the acrylate monomer may desirably be selected from the group consisting of pentaerythritol triacrylate (PETA), pentaerythritol tetraacrylate (PETTA) and dipentaerythritol hexaacrylate (DPHA).

In this case, the acrylate monomer may be present in a content of 17 to 25% by weight based on the weight of the polyvinyl alcohol when acrylate monomer is pentaerythritol triacrylate.

Furthermore, the acrylate monomer may be present in a content of 15 to 21% by weight based on the weight of the polyvinyl alcohol when the acrylate monomer is pentaerythritol tetraacrylate.

Also, the acrylate monomer may be present in a content of 13 to 21% by weight based on the weight of the polyvinyl alcohol when the acrylate monomer is dipentaerythritol hexaacrylate.

And, the composition for an alignment film may be dissolved in a mixture solvent of water and alcohol to form a composition solution for an alignment film.

Also, the composition for an alignment film may be present in a content of 2.44 to 7.25% by weight in the composition solution.

Furthermore, a ratio of water:alcohol in the mixture solvent may range from 40:60 to 50:50.

Also, the alcohol may be selected from the group consisting of methyl alcohol, ethyl alcohol and isopropyl alcohol.

And, the liquid crystal film may be prepared by adding polymeric rod-type liquid crystal compound with splay alignment in a solvent, the liquid crystal compound being prepared by adding one or both of 4-(6-acryloyoxyhexyloxy)-benzoic acid(4-cyanophenyl ester) and 4-(6-acryloyoxyhexyloxy)-benzoic acid[4-trans-4-propylcyclohexyl]phenyl ester] to 4-(3-acryloyoxypropyloxy)-benzoic acid 2-methyl-1,4-phenylene ester, followed by coating an alignment film with the resultant mixture and undergoing drying an curing processes.

Also, the polyvinyl alcohol may have a weight average molecular weight of 85,000 to 146,000, and may be hydrolyzed by 96% or less.

And, the compatibilizing agent may be desirably soluble in water.

Furthermore, the compatibilizing agent may be poly(4-vinylphenol).

Also, the photo initiator may be soluble in water.

In this case, the photo initiator may include one selected from the group consisting of IRGACURE 2959, IRGACURE 500 and IRGACURE 754.

The O-plate according to the present invention may further include at least one optical layer in addition to the above-mentioned laminated layer structure.

According to an aspect of the present invention, there is provided a polarizing plate including the O-plate having the above characteristics, wherein one or both of protective films formed in both sides of a polarizer are O-plate films.

Advantageous Effects

According to the present invention, the additional separation and purification processes are not required, and it is possible to prepare the optical compensation film including the composition for an alignment film having excellent adhesiveness to the liquid crystal layer formed on the alignment film. The alignment film has good adhesiveness even when it is formed on certain substrates rather than triacetyl cellulose such as a cycloolefin polymer, and the liquid crystal film formed on the alignment film has a minimized optical-axis departure angle, and therefore the optical compensation film according to the present invention has excellent durability and good optical properties even under the hot and humid environments.

Also, the polarizing plate including the optical compensation film according to the present invention has good productivity and excellent optical properties since one or both of the protective films may be substituted with the optical film.

BRIEF DESCRIPTION OF THE DRAWINGS

The above and other aspects, features and other advantages of the present invention will be more clearly understood from the following detailed description taken in conjunction with the accompanying drawings, in which.

BEST MODE FOR CARRYING OUT THE INVENTION

Exemplary embodiments of the present invention will now be described in detail with reference to the accompanying drawings.

In order to solve the above problems, the present inventors have ardently attempted to develop an O-plate and an integrated polarizing plate including the O-plate that meets the objects of the present invention, and found that the objects of the present invention may be satisfied when the optical compensation film includes an alignment film made of a composition for an alignment film having specific physical properties as described later, and therefore the present invention is completed on the basis of the above facts.

Figure 1:
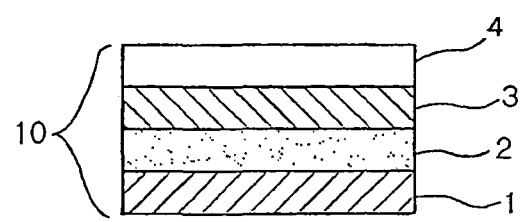
FIG. 1 is a schematic cross-sectional view illustrating one example of laminating an optical compensation film according to one exemplary embodiment of the present invention.

That is, the O-plate according to the present invention includes a substrate 1, an alignment film 2 coated onto the substrate, and a liquid crystal film 3 coated onto the alignment film 2 and endowed with splay alignment property by the alignment film 2, as shown in FIG. 1, and may further include an optical film layer 4 that has been provided in the art, when necessary. When a composition used to prepare the alignment film 2 is made of certain components provided in the present invention, it is possible to obtain an O-plate having excellent physical properties such as an adhesive force between the substrate 1 and the liquid crystal film 3. An alignment film including the O-plate of the present invention may be manufactured by coating the substrate 1 with the composition, drying and curing the composition, followed by rubbing the composition.

In particular, the substrates used in the O-plate of the present invention includes cycloolefin polymer (COP)-based substrates, as well as conventional triacetyl cellulose (TAC) films. When the substrates are used in the O-plate, the O-plate of the present invention may be used under hot and humid environments and has excellent durability. Of course, even when the conventional triacetyl cellulose film is used in the O-plate, the O-plate of the present invention may have excellent durability compared to the conventional O-plate since the O-plate of the present invention has an good adhesive force between the alignment film and the liquid crystal film. The O-plate formed of these cycloolefin polymer (COP)-based substrates may have characteristics that discriminate the present invention from other inventions.

The composition for an alignment film used to prepare an alignment film including the O-plate of the present invention is composed of polyvinyl alcohol, a multi-functional acrylate monomer, a compatibilizing agent, a photo initiator and a solvent and its physical properties are described in detail, as follows.

Figure 2:
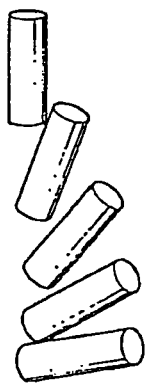
FIG. 2 is a schematic view illustrating a splay alignment pattern.

First, adhesive property between the liquid crystal and the alignment film and conditions for splay alignment of liquid crystal should be all satisfied to splay-aligning the liquid crystal, as shown in FIG. 2.

The composition for an alignment film according to the present invention includes polyvinyl alcohol (PVA), 13 to 25% by weight of an acrylate monomer based on the weight of the polyvinyl alcohol, 20 to 30% by weight of an aqueous compatibilizing agent based on the weight of the acrylate monomer, and 10 to 50% by weight of an aqueous photo initiator based on the weight of the acrylate monomer. The composition for an alignment film according to the present invention is preferably dissolved in a mixture solvent of water and alcohol to so that it can be present in a content of 2.44 to 7.25% by weight in the total content of the composition solution.

Among them, the polyvinyl alcohol is a main compound that forms an alignment film, and all contents of the other components are used on the basis of the weight of the polyvinyl alcohol. The polyvinyl alcohol has a weight average molecular weight (Mw) of 85,000 to 146,000, and is preferably hydrolyzed by 96% or less. However, the weight average molecular weight of the polyvinyl alcohol slightly affects adhesive property, but does not have wide difference in performance of the alignment film. Generally, polyvinyl alcohol having a weight average molecular weight of 85,000 to 146,000 is widely used. Furthermore, the polyvinyl alcohol that is hydrolyzed by 80% or more in general is widely used, but the polyvinyl alcohol that is hydrolyzed by greater than 96% is not desirable since it adversely affect adhesive property and alignment characteristic of the alignment film, and therefore it is preferred to use the polyvinyl alcohol that is hydrolyzed by 96% or less. Also, there is no need to particularly define the lowest degree of hydrolysis, but a minimum degree of hydrolysis of the polyvinyl alcohol which is obtainable is about 80% in general.

Similarly, the acrylate monomer is also an important compound that assists the polyvinyl alcohol through the cross-linking reaction to form an alignment film having advantageous effects of the present invention, and, thus, the acrylate monomer is preferably present in a content of 13 to 25% by weight, based on the weight of the polyvinyl alcohol. When the acrylate monomer is present in a content of less than 13% by weight based on the weight of the polyvinyl alcohol, interlayer adhesion between the alignment film and the liquid crystal film, or between the alignment film and the substrate such as cycloolefin polymer (COP) is poor, and therefore the alignment film or the liquid crystal film may be peeled off. On the contrary, when the acrylate monomer is present at a content of greater than 25% by weight based on the weight of the polyvinyl alcohol, it is difficult to splay-align a liquid crystal. The acryl monomer more preferably includes multifunctional acrylates, and, among them, particularly preferably includes $C_3$-$C_6$ acrylates, that are triacrylate (in particular, pentaerythritol triacrylate, PETA), tetraacrylate (in particular, pentaerythritol tetraacrylate, PETTA), hexaacrylate (in particular, dipentaerthritol hexaacrylate, DPHA), etc. They may be used alone or in combinations thereof. When triacrylate is used as the monomer, a suitable content range of the triacrylate ranges from 17 to 25% by weight, and preferably 20% by weight, based on the weight of the polyvinyl alcohol, and when tetraacrylate is used as the monomer, the tetraacrylate is preferably present at a content of 15 to 21% by weight based on the weight of the polyvinyl alcohol. Also, when hexaacrylate is used as the monomer, the hexaacrylate is preferably used at a content of 13 to 21% by weight based on the weight of the polyvinyl alcohol. The upper and lower limits of the components are defined to secure an interlayer adhesive force and easily achieve the splay alignment at the same time. The triacrylate is the most preferably present at a content of 20% by weight, the tetraacrylate is the most preferably present at a content of 18% by weight, and the hexaacrylate is the most preferably present at a content of 17% by weight, based on the weight of the polyvinyl alcohol.

Also, a compatibilizing agent is preferably used as an adhesion promoter to improve adhesiveness. The compatibilizing agent is preferably present at a content of 20 to 30% by weight, based on the weight of the acrylate monomer. When the compatibilizing agent is present at a content of less than 20% by weight, the composition for an alignment film is not uniformly dispersed on a substrate to wet a surface of the substrate if the substrate is coated with the composition for an alignment film according to the present invention in the form of solution, which leads to a dewetting phenomenon where solution drops lumps together. Accordingly, it is difficult to form an alignment film on the substrate. On the contrary, when the content of the compatibilizing agent exceeds 30% by weight based on the weight of the acrylate monomer, it is difficult to splay-align a liquid crystal film. The most preferable content of the compatibilizing agent is 25% by weight, based on the weight of the acrylate monomer. The compatibilizing agent is preferably soluble in water considering that the composition for an alignment film is preferably dissolved in a mixture solvent of water and alcohol, and used. Examples of the above-mentioned aqueous compatibilizing agent include poly(4-vinylphenol) with a weight average molecular weight of 8,000, poly(4-vinylphenol) with a weight average molecular weight of 20,000, poly(ethylene imine), poly(2-ethyl-2-oxazoline), 1-[N-[poly(3-allyloxy-2-hydroxypropyl)]-2-aminoethyl]-2-imidazolidinone solution, poly[bis(2-chloroethyl)ether-alt-1,3-bis[3-(dimethylamino)propyl]urea], etc.

In order to form the composition for an alignment film coated onto the substrate into an alignment film, it is necessary to cure the composition for an alignment film. The curing of the composition for an alignment film may be commonly carried out by drying the composition for an alignment film to evaporate a solvent and optically curing (particularly, UV-curing) the solvent-free alignment film. For this purpose, the composition for an alignment film necessarily includes a photo initiator. The photo initiator is preferably present at a content of 10 to 50% by weight, based on the weight of the acrylate monomer. When the photo initiator is present at a content of less than 10% by weight based on the weight of the acrylate monomer, a photopolymerization reaction is not easily carried out, and therefore it is difficult to cure the alignment film, whereas it is difficult to align a liquid crystal when the content of the photo initiator exceeds 50% by weight based on the weight of the acrylate monomer. The most preferable content of the photo initiator is 25% by weight, based on the weight of the acrylate monomer. Also, the photo initiator is preferably soluble in water considering that the photo initiator are used in a mixture solvent of water and alcohol, and examples of the photo initiator includes IRGACURE 2959 (2-hydroxy-1-[4-(2-hydroxyethoxy)phenyl]-2-methyl-1-propanone), IRGACURE 500 (1-hydroxy-cyclohexyl-phenyl-ketone+benzophenone), IRGACURE 754 (oxy-phenyl-acetic acid 2-[2-oxo-2-phenyl-acetoxy-ethoxy]-ethyl ester and oxy-phenyl-acetic 2-[2-hydroxy-ethoxy]-ethyl ester), all of which are commercially available from Ciba-Geigy.

The composition for an alignment film according to the present invention having the above-mentioned components is preferably dissolved in a mixture solvent of water and alcohol, and used. Here, it is preferred to use methyl alcohol, ethyl alcohol, isopropyl alcohol and the like as the alcohol. Here, a ratio of water:alcohol in the solvent preferably ranges from 40:60 to 50:50 when the mixture solvent is prepared, and the most preferable ratio of the water:alcohol is 41:59 when methylalcohol or ethylalcohol is used as the alcohol, and 40:60 when isopropyl alcohol is used as the alcohol. The composition for an alignment film is preferably present at a content of 2.44 to 7.25% by weight based on the total weight of the composition (in the form of solution). In this case, when the composition for an alignment film is present at a content of less than 2.44% by weight, it is difficult to form an alignment film of sufficient thickness due to the presence of the excessive solvent, and it is impossible to secure adhesiveness. On the contrary, when the composition for an alignment film is present at a content of greater than 7.25% by weight, it is difficult to splay-align a liquid crystal. Accordingly, a suitable content of the composition for an alignment film except for the solvent ranges from 2.44 to 7.25% by weight.

At least one compound selected from the group consisting of compounds to which an acrylate group is bound as a reactive group may be used as a polymeric liquid crystal compound having splay alignment coated on the alignment film prepared from the composition for an alignment film, and the liquid crystal film may be preferably prepared by dissolving a mixture of liquid crystal compounds in a solvent, followed by coating an alignment film with the resultant mixture and undergoing drying and curing processes, the mixture of liquid crystal compounds being prepared by adding one or both of 4-(6-acryloyoxyhexyloxy)-benzoic acid(4-cyanophenyl ester) and 4-(6-acryloyoxyhexyloxy)-benzoic acid[4-trans-4-propylcyclohexyl]phenyl ester to 4-(3-acryloyoxypropyloxy)-benzoic acid 2-methyl-1,4-phenylene ester.

Also, the polarizing plate of the present invention may include the above-mentioned O-plate.

Figure 3:
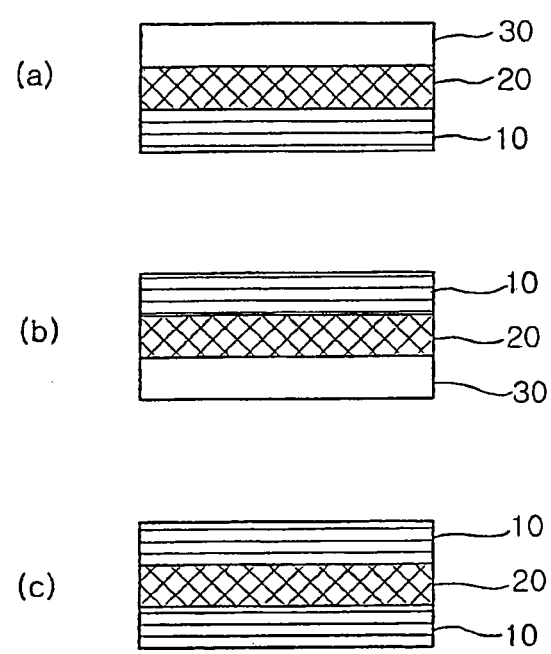
FIG. 3 is a schematic cross-sectional view illustrating lamination patterns of a polarizing plate according to one exemplary embodiment of the present invention.

The polarizing plate of the present invention including the above-mentioned O-plate is more preferably formed integrally. In the present invention, by the term "integrated", it is meant that, while the conventional polarizing plate has a shape where protective films are provided in both side of a polarizer to make up for the weak points of the polarizer and has a shape including the O-plate such as a retardation film or viewing angle compensation film when necessary, the polarizing plate according to the present invention has a shape where one or both of the protective films 30 formed on both sides of the polarizer in the conventional polarizing plate are replaced with an O-plate, as shown in FIG. 3. That is, the integrated polarizing plate represented in the present invention is a polarizing plate having a shape of an O-plate 10—a polarizer 20—protective film 30 (FIG. 3(a)), a protective film 30—a polarizer 20—O-plate 10 (FIG. 3(*b*)), or an O-plate 10 a polarizer 20—O-plate 10 (FIG. 3(*c*)). Hereinafter, the integrated polarizing plates with such a shape are generally referred to as a "polarizing plate with a shape where one or both of protective films formed on both sides of a polarizer are replaced with an O-plate".

MODE FOR THE INVENTION

Hereinafter, exemplary embodiments of the present invention will be described in detail with reference to the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

EXAMPLES

Preparation of Alignment Film

Example 1

A composition solution for an alignment film was prepared by dissolving a controlled content of the composition for an alignment film in a mixture solvent of water and alcohol at a temperature of 150° C., as listed in the following Table 1.

TABLE 1

|  |  |  | weight (g) | weight ratio (%) |
|---|---|---|---|---|
| Composition solution of a for an alignment film | Mixed solvent | Water | 480 | 47.93 |
|  |  | Ehtanol | 497 | 49.63 |
|  | Composition for an alignment film | Polyvinyl alcohol (87% hydrolysis), Mw 85,000~124,000 | 20 | 2.00 |
|  |  | dipentaerythritol hexaacrylate | 3 | 0.30 |
|  |  | poly(4-vinylphenol) Mw 8,000 | 0.75 | 0.075 |
|  |  | IRGACURE 2959 | 0.75 | 0.075 |

A cycloolefin polymer (COP) was coated with the composition solution for an alignment film prepared according to the above method, using a wire bar, and the composition solution for an alignment film was dried with hot wind for 2 minutes in a 100° C. dry oven, and then cured once at a rate of 3 m/min using an 80 W/CM high-pressure mercury vapor lamp, and a surface of the cured alignment film was rubbed to prepare an alignment film.

A polymeric liquid crystal mixture having a splay alignment was dissolved in toluene at a solid concentration of 25% by weight, the polymeric liquid crystal mixture being prepared by mixing 16% by weight of 4-(6-acryloyoxyhexyloxy)-benzoic acid(4-cyanophenyl ester), 40% by weight of 4-(6-acryloyoxyhexyloxy)-benzoic acid[4-trans-4-propylcyclohexyl]phenyl ester, 40% by weight of 4-(3-acryloyoxypropyloxy)-benzoic acid 2-methyl-1,4-phenylene ester, and 4% by weight of IRGACURE 907 (manufactured from Ciba-Geigy, Switzerland). The alignment film was coated with the resultant liquid crystal solution using a wire bar, dried with hot wind for one minute in a 70° C. dry oven, and then cured once at a rate of 3 m/min, using an 80 W/CM high-pressure mercury vapor lamp, to prepare a liquid crystal film.

As a result, it is possible to finally prepare a film laminate including a COP substrate, a rubbed alignment film formed on the COP substrate, and a liquid crystal film formed on the alignment film, all of which are laminated in sequence.

Adhesive forces between layers, that is, between the COP and the alignment film, and between the alignment film and the liquid crystal film, were evaluated according to the ASTM standard, and phase difference and optical-axis departure angles were measured according to the viewing angles using an AXOSCAN so as to evaluate optical properties of the liquid crystal film formed on the alignment film.

Example 2

An alignment film is formed on a COP substrate in the same manner as in Example 1 except that a composition solution is prepared with components of the alignment film as listed in the following Table 2, and a film laminate was then prepared in the same manner as used to form a liquid crystal film, including a COP substrate, an alignment film and a liquid crystal film, all of which are laminated in sequence.

TABLE 2

|  |  |  | weight (g) | weight ratio (%) |
|---|---|---|---|---|
| Composition solution of a for an alignment film | Mixed solvent | Water | 480 | 47.90 |
|  |  | Ehtanol | 496 | 49.50 |
|  | Composition for an alignment film | Polyvinyl alcohol (87% hydrolysis), Mw 85,000~124,000 | 20 | 2.00 |
|  |  | pentaerythritol triacrylate | 4 | 0.40 |
|  |  | poly(4-vinylphenol) Mw 8,000 | 1 | 0.1 |
|  |  | IRGACURE 2959 | 1 | 0.1 |

Example 3

An alignment film is formed on a COP substrate in the same manner as in Example 1 except that a composition solution is prepared with components of the alignment film as listed in the following Table 3, and a film laminate was then prepared in the same manner as used to form a liquid crystal film, including a COP substrate, an alignment film and a liquid crystal film, all of which are laminated in sequence.

TABLE 3

|  |  |  | weight (g) | weight ratio (%) |
|---|---|---|---|---|
| Composition solution of a for an alignment film | Mixed solvent | Water | 480 | 47.93 |
|  |  | Ehtanol | 497 | 49.63 |
|  | Composition for an alignment film | Polyvinyl alcohol (87% hydrolysis), Mw 85,000~124,000 | 20 | 2.00 |
|  |  | pentaerythritol tetraacrylate | 3 | 0.30 |
|  |  | poly(4-vinylphenol) Mw 8,000 | 0.75 | 0.075 |
|  |  | IRGACURE 2959 | 0.75 | 0.075 |

Comparative Example 1

An alignment film is formed on a COP substrate in the same manner as in Example 1 except that a composition solution is prepared with components of the alignment film as listed in the following Table 4, and a film laminate was then prepared in the same manner as used to form a liquid crystal film, including a COP substrate, an alignment film and a liquid crystal film, all of which are laminated in sequence. The composition as listed in the following Table 4 means a composition that has been widely used as a polyvinyl alcohol-based alignment film in the art.

TABLE 4

|  |  |  | weight (g) | weight ratio (%) |
|---|---|---|---|---|
| Composition solution for an alignment film | Mixed solvent | Water | 568 | 56.8 |
|  |  | Ethanol | 412 | 41.2 |
|  | Polyvinyl alcohol (87% hydrolysis), Mw 85,000~124,000 |  | 20 | 2 |

Comparative Example 2

A film laminate was prepared by laminating a liquid crystal film on a COP substrate without forming an alignment film.

Determination of Phase Difference in Splay Alignment

Figure 4:
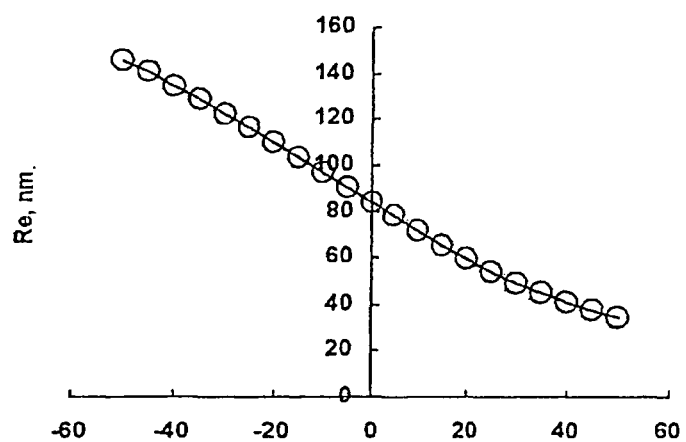
FIG. 4 is a graph illustrating a distribution of phase difference to viewing angles of a splay-aligned liquid crystal film formed on an alignment film as prepared in Example 2 of the present invention.

A phase difference distribution was determined according to the viewing angles of the liquid crystal film formed on the alignment film prepared according to Example 2, as shown in FIG. 4. As seen from the graph of FIG. 4, it was revealed that the phase difference of the splay-aligned liquid crystal film is distributed uniformly according to the increasing viewing angles. Although not shown herein, it was confirmed that the graphs are plotted in the similar manner in the case of Examples 1 and 3.

Determination of Alignment Departure to Rubbing Angle

Figure 5:
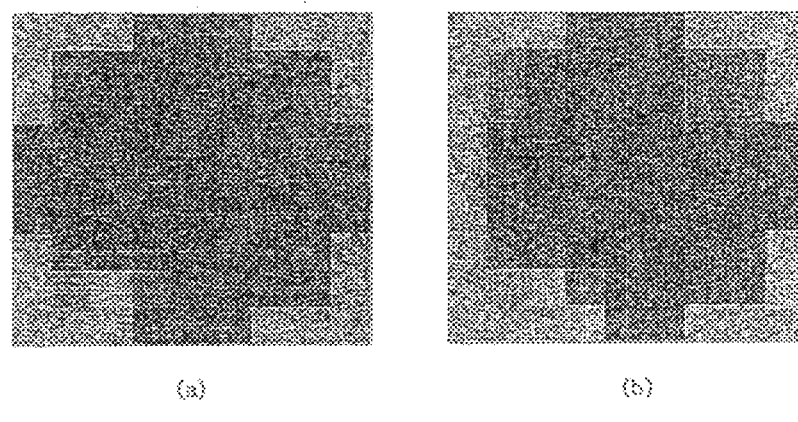
FIG. 5 is a diagram illustrating the results obtained by comparing degrees of optical-axis departure of an alignment film prepared in Example 1 of the present invention and a liquid crystal film formed on a conventional alignment film.

To compare with the O-plate prepared in Example 1, a WV (Wide View)-EA thin film (FUJI) as the TN-mode compensation film was evaluated together for optical-axis departure properties, and the results were shown in FIG. 5. In FIG. 5, a direction of lines present in rectangles means a degree of alignment of the liquid crystal to the rubbing angles. That is, the liquid crystal has a relatively lower optical-axis departure degree as the lines are aligned in the same direction. According to the present invention, it was revealed that the optical-axis departure angle to the rubbing angle was about 0.16° (degree) for Example 1, and the film used in the Comparative example has an optical-axis departure angle of about 0.31°.

Determination of Alignment Properties and Adhesiveness

The liquid crystal films prepared in Examples 1, 2 and 3, Comparative examples 1 and 2 were evaluated for alignment properties, adhesiveness between the substrate and the alignment film, and adhesiveness between the alignment film and the liquid crystal, and the results were listed in the following Table 5. The evaluation of the alignment properties was dividedly carried out: when there is no alignment at all (X); and when there is alignment with a slight deviation (O). The adhesiveness was determined by cross-cutting a surface of the liquid crystal film with a line style such as checkers at a distance of 1 mm according to the ASTM standard, and determining whether the liquid crystal film remains attached to the substrate when a cellophane tape is attached to the liquid crystal film and then detached from the liquid crystal film. Here, Level "O" represents that the liquid crystal film is intactly attached to the substrate, Level "x" represents that the liquid crystal film is partially or completely detached from the checkers of the substrate, and "-" represents that there is no result.

TABLE 5

|  |  |  | Adhesiveness | |
|---|---|---|---|---|
|  |  | Alignment properties | Substrate/alignment film | Alignment film/liquid crystal film |
| Examples | 1 | O | O | O |
|  | 2 | O | O | O |
|  | 3 | O | O | O |
| Comparative examples | 1 | O | X | — |
|  | 2 | X | — | — |

Preparation and Evaluation of Integrated O-Plate Polarizing Plate

Figure 6:
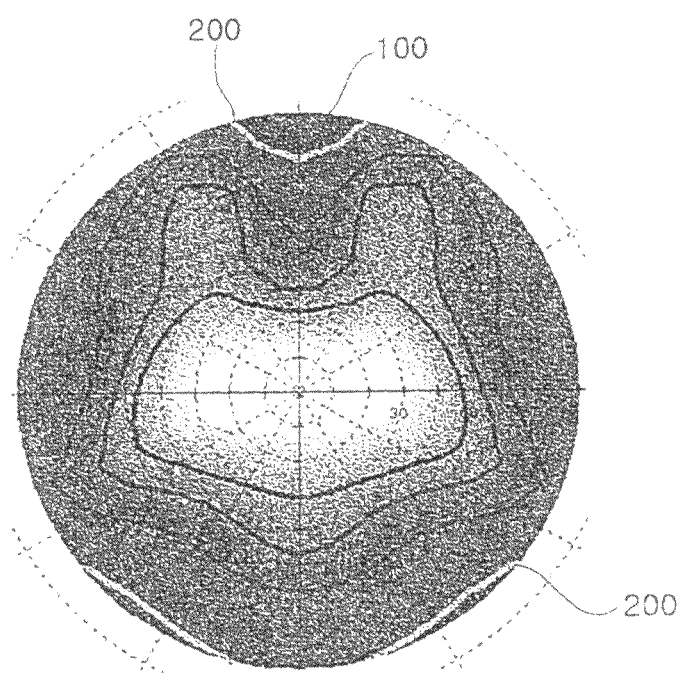
FIG. 6 is a graph illustrating a contrast ratio when a polarizing plate as an integrated O-Plate prepared in Example 4 of the present invention is adhered to a TN-mode liquid crystal cell.

The COP-integrated O-Plate prepared in Example 2 and the TAC were laminated as a protective film in two sides of a PVA polarizer, onto which is stretched after iodide is absorbed, and one side of the PVA polarizer was coated with an acrylic adhesive to prepare a polarizing plate. In this case, the absorption axis of the polarizer is disposed vertically to a ground axis of the COP. The polarizing plates prepared thus were attached respectively to an observer's side and a backlight side so that the liquid crystal layer (O-Plate) may dispose toward to liquid crystal cells in a liquid crystal display device using TN-mode liquid crystal cells, and viewing angles were measured by disposing the absorption axes of the polarizing plates attached to the observer's side and the backlight side to be in an E-mode. The prepared liquid crystal display device was measured for contrast properties using an EZContrast measuring system (ELDIM), and the results were shown in FIG. 6. In FIG. 6, a line 100 represents that its contrast ratio is 10:1, and a line 200 represents that its contrast ratio is 30:1. The viewing angle ranges, in which the contrast ratio (C/R) of the O-plates prepared in Examples 1 to 3 was maintained to a level of 10 or more when the O-plates were laminated onto the PVA polarizer in the same manner as described above and measured for contrast ratio (C/R), are listed in the following Table 6.

TABLE 6

|  |  | Viewing angle | | |
| --- | --- | --- | --- | --- |
|  |  | Up | Down | Left/Right |
| Examples | PVA + Example1<br>PVA + Example2<br>PVA + Example3 | 75 | 80 | 80 |

From the results as listed in the Table 6, it was revealed that the O-plate according to the present invention may secure a wide viewing angle.

According to the present invention, the additional separation and purification processes are not required, and it is possible to prepare the optical compensation film including the composition for an alignment film having excellent adhesiveness to the liquid crystal layer formed on the alignment film. The alignment film has good adhesiveness even when it is formed on certain substrates rather than triacetyl cellulose such as a cycloolefin polymer, and the liquid crystal film formed on the alignment film has a minimized optical-axis departure angle, and therefore the optical compensation film according to the present invention has excellent durability and good optical properties even under the hot and humid environments.

Also, the polarizing plate including the optical compensation film according to the present invention has good productivity and excellent optical properties since one or both of the protective films may be substituted with the optical film.

While the present invention has been shown and described in connection with the exemplary embodiments, it will be apparent to those skilled in the art that modifications and variations can be made without departing from the spirit and scope of the invention as defined by the appended claims.

The invention claimed is:

1. An O-plate, comprising:
a substrate;
an alignment film prepared by coating the substrate with a composition for an alignment film that comprises a polyvinyl alcohol (PVA); 13 to 25% by weight of an acrylate monomer based on the weight of the polyvinyl alcohol; 20 to 30% by weight of a compatibilizing agent based on the weight of the acrylate monomer; 10 to 50% by weight of an aqueous photo initiator based on the weight of the acrylate monomer; and a solvent, followed by undergoing drying, curing and rubbing processes; and
a splay-aligned liquid crystal film formed on the alignment film,
wherein the solvent comprises a mixture of water and alcohol, and the water to alcohol ratio of the solvent is 40:60 to 50:50,
wherein the compatibilizing agent is poly(4-vinylphenol), and wherein the substrate comprises triacetyl cellulose or a cycloolefin polymer (COP).

2. The O-plate of claim 1, wherein one or more multifunctional acrylate monomer is used as the acrylate monomer.

3. The O-plate of claim 2, wherein the acrylate monomer is selected from the group consisting of pentaerythritol triacrylate (PETA), pentaerythritol tetraacrylate (PETTA) and dipentaerythritol hexaacrylate (DPHA).

4. The O-plate of claim 3, wherein the acrylate monomer is present in a content of 17 to 25% by weight based on the weight of the polyvinyl alcohol when acrylate monomer is pentaerythritol triacrylate.

5. The O-plate of claim 3, wherein the acrylate monomer is present in a content of 15 to 21% by weight based on the weight of the polyvinyl alcohol when the acrylate monomer is pentaerythritol tetraacrylate.

6. The O-plate of claim 3, wherein the acrylate monomer is present in a content of 13 to 21% by weight based on the weight of the polyvinyl alcohol when the acrylate monomer is dipentaerythritol hexaacrylate.

7. The O-plate of claim 1, wherein the composition for an alignment film is present in a content of 2.44 to 7.25% by weight in the composition solution.

8. The O-plate of claim 1, wherein the alcohol is selected from the group consisting of methyl alcohol, ethyl alcohol and isopropyl alcohol.

9. The O-plate of claim 1, wherein the liquid crystal film is prepared by adding a polymeric rod-type liquid crystal compound with splay alignment to a solvent, the liquid crystal compound being prepared by adding one or both of 4-(6-acryloyoxyhexyloxy)-benzoic acid(4-cyanophenyl ester) and 4-(6-acryloyoxyhexyloxy)-benzoic acid[4-trans-4-propylcyclohexyl]phenyl ester] to 4-(3-acryloyoxypropyloxy)-benzoic acid 2-methyl-1,4-phenylene ester, followed by coating an alignment film with the resultant mixture and undergoing drying and curing processes.

10. The O-plate of claim 1, wherein the polyvinyl alcohol has a weight average molecular weight of 85,000 to 146,000, and is hydrolyzed by 96% or less.

11. The O-plate of claim 1, wherein the compatibilizing agent is soluble in water.

12. The O-plate of claim 1, wherein the photo initiator is soluble in water.

13. The O-plate of claim 12, wherein the photo initiator comprises one selected from the group consisting of the photo initiator composed of 2-hydroxy-1-[4-(2-hydroxyethoxy)phenyl]-2-methyl-1-propanone, the photo initiator composed of 1-hydroxy-cyclohexyl-phenyl-ketone and benzophenone, and the photo initiator composed of oxy-phenyl-acetic acid 2-[2 oxo-2 phenyl-acetoxy-ethoxy]ethyl ester and oxy-phenyl-acetic 2-[2-hydroxy-ethoxy]-ethyl ester.

14. The O-plate of claim 1, further comprising at least one optical layer.

15. A polarizing plate comprising the O-plate of claim 1, wherein one or both of protective films formed in both sides of a polarizer are O-plate films.

* * * * *